United States Patent Office 2,899,401
Patented Aug. 11, 1959

2,899,401

METHOD OF INCORPORATING OIL IN RUBBERY ISOOLEFIN POLYMER

Lawrence T. Eby, Linden, N.J., assignor to Esso Research and Engineering Company, a corporation of Delaware Application December 6, 1955, Serial No. 551,246

7 Claims. (Cl. 260—33.6)

This invention relates to polymerization processes and particularly to processes for the low temperature polymerization of isoolefins or mixtures of isoolefins and diolefins. In a more specific aspect, the invention relates to the modification and/or plasticization of isoolefin polymers produced at low temperatures.

Certain preferred details of the process will be apparent and the invention itself will be best understood by reference to the following specification and accompanying drawings.

It has been known for some time that high molecular weight polymers, i.e. having a molecular weight of from about 15,000–25,000 up to 300,000 or more (as determined by the Staudinger method), are obtained if isoolefins, such as isobutylene, are contacted with Friedel-Crafts type catalyst such as aluminum chloride and the like at temperatures below about —10° F. (See, for example, Mueller-Cunradi U.S. Patent No. 2,203,873, issued June 11, 1940.) Later it was found that a copolymer which is curable with sulfur is obtained if a mixture of about 70 to 99.5 weight percent of an isoolefin such as isobutylene with about 30 to 0.5 weight percent of a conjugated diolefin such as butadiene or isoprene is treated with a solution of a Friedel-Crafts type catalyst such as aluminum chloride in a non-complex forming, low-freezing solvent such as methyl or ethyl chloride and at temperatures of between —10° F. and —250° F., preferably between —20° F. and —150° F. (see, for example, Australian Patent No. 112,875, issued July 31, 1941). Copolymers of isoolefins with aromatic hydrocarbons, having unsaturated side chains, such as styrene may also be formed at these low temperatures. These polymerizations have been conducted in the presence of an internal refrigerant such as liquefied ethylene, in which case the heat of reaction is removed directly by evaporation of part of the ethylene without the necessity for transferring heat through the surfaces of the reaction vessels or through cooling coils arranged in the reaction vessels, or in the presence of large quantities of a diluent such as methyl chloride, cooled by external means. Consequently, the reaction is now carried out in such a manner as to keep the solid polymer particles in a finely divided condition suspended in the cold reaction mixture so that a slurry of solid polymer in the cold reaction mixture is obtained which can be handled at low temperature. In view of the volatile nature of certain of the reactants and diluents, the slurry is discharged into a well-agitated body of a heated liquid medium, such as water containing a suitable slurry dispersing agent. Then liquid or flashing medium is maintained at a temperature well above the boiling point of the majority of the volatile materials accompanying the polymer, to form a slurry of small polymer particles in the warm liquid and to flash off volatile constituents of the reaction mixture. This slurry is then stripped of any residual volatile materials and dried while being conveyed through a tunnel on a screen or on sections of a perforated plate in the presence of warm air. The polymer is then passed to a mill where it is worked into a compact sheet for further processing as desired. It is at this point that extenders, such as naphthenic-type or aromatic-type oils, are usually added to lower the internal viscosity and provide a rubber of good elasticity and at the same time lower the cost of the compound. However, this method of incorporation of the extender oil involves high energy expenditure and considerably increases manufacturing time or the number of mills or extruders required. Since the reactor mixture is a slurry and not a solution, and the temperature is very low, there is a problem in getting a homogeneous mixture of extender oil and polymer. The oil cannot be added to the feed since it has a detrimental effect on the polymerization. Introduction of the oil into the flash tank is not feasible because the wet polymer particles do not imbibe the oil readily, so that free oil is present with the result that the polymer particles stick together and cause difficulty in the flash tank as well as subsequent finishing operations. Introduction of the oil directly into the reactor overflow is also not feasible since the oil coagulates the cold slurry, thickens drastically, or even solidifies at the low temperature and thus does not go into solution in the polymer.

In copending application Ser. No. 481,077, filed January 11, 1955 for Stanley E. Jaros, now U.S. Patent No. 2,821,515, it is shown that oil can be easily incorporated into the rubber by first dissolving the oil in a diluent, e.g. methyl chloride, ethyl chloride, methylene chloride, ethylene, butane or pentane, cooling the solution to substantially reactor temperature, and mixing this solution or emulsion with the reactor slurry before it is admitted to the flash tank system. Preferably the diluent used is the same as the polymerization diluent in order to simplify solvent recovery processes. However, the amount of oil that may be added by this method is limited by the type of oil employed and the amount of slurry dispersing agent in the flash tank. The amount of slurry dispersing agent required in the flash tank to obtain stable slurries results in too much dispersing agent in the finished polymer. Such a large amount of slurry dispersing agent in the flash tank is often uneconomical and sometimes imparts undesirable properties to the finished polymer.

It has now been found that smaller amounts of slurry dispersing agent can be used and smoother slurries obtained if the dispersing agent is added to the cold slurry along with the oil before it is introduced into the flash tank.

Broadly, the present invention consists of the steps of preparing a reactive mixture of the desired olefinic material at the desired low temperature, as taught in the Thomas and Sparks Patents 2,356,127 and 2,356,128; generally it is desirable to use isoolefins having not more than about 7 carbon atoms, the reaction material being preferably isobutylene, either with or without a diolefin such as butadiene, or isoprene, or 2,3-dimethyl-butadiene-1,3; or with piperylene or a non-conjugated diolefin such as 2-methyl hexadiene-1,5; 2,6-dimethyl hexadiene-1,5; or triolefins such as hexatriene, myrcene, 1,6-dimethyl heptatriene-1,3,5 and 2,4,6-trimethyl-1,3,5-hexatriene or other olefins having a plurality of double bonds; and cooling the mixture by internal or external refrigeration, e.g. by liquid ethylene, to a temperature ranging from —40° C. to —100° C. or as low as —160° C. To this mixture there is then added a Friedel-Crafts type active halide catalyst, which may be aluminum chloride in solution in an inert low-freezing solvent or may be other similar active halide catalyst materials. This polymerization reaction is conducted under conditions to give a finely pulverulent form of polymer or interpolymer particles, which is highly desirable in order to permit the maximum speed of processing the solid polymer in subsequent operations.

When the polymerization reaction has reached the desired stage of completion, it is passed to a flash tank containing warm water and a slurry dispersing agent which volatilizes out most of the volatile components and, at the same time, deactivates and washes out much of the deactivated catalyst. The polymer is maintained in a form which is easy to pump by the addition to the warm water, prior to or simultaneously with the addition of the polymer thereto, of a suitable dispersing agent.

According to the present invention, therefore, when a solution of oil in a suitable solvent is added to the transfer line between the reaction zone and the flash zone as taught in Ser. No. 481,077, now U.S. Patent 2,821,515, the slurry dispersing agent must be added to the slurry in the transfer line, rather than to the flash tank in order to assure a stable slurry.

Certain preferred details of construction together with additional objects and advantages will be apparent and the invention itself will be best understood by reference to the following specification and to the accompanying drawings wherein.

Figure 1:
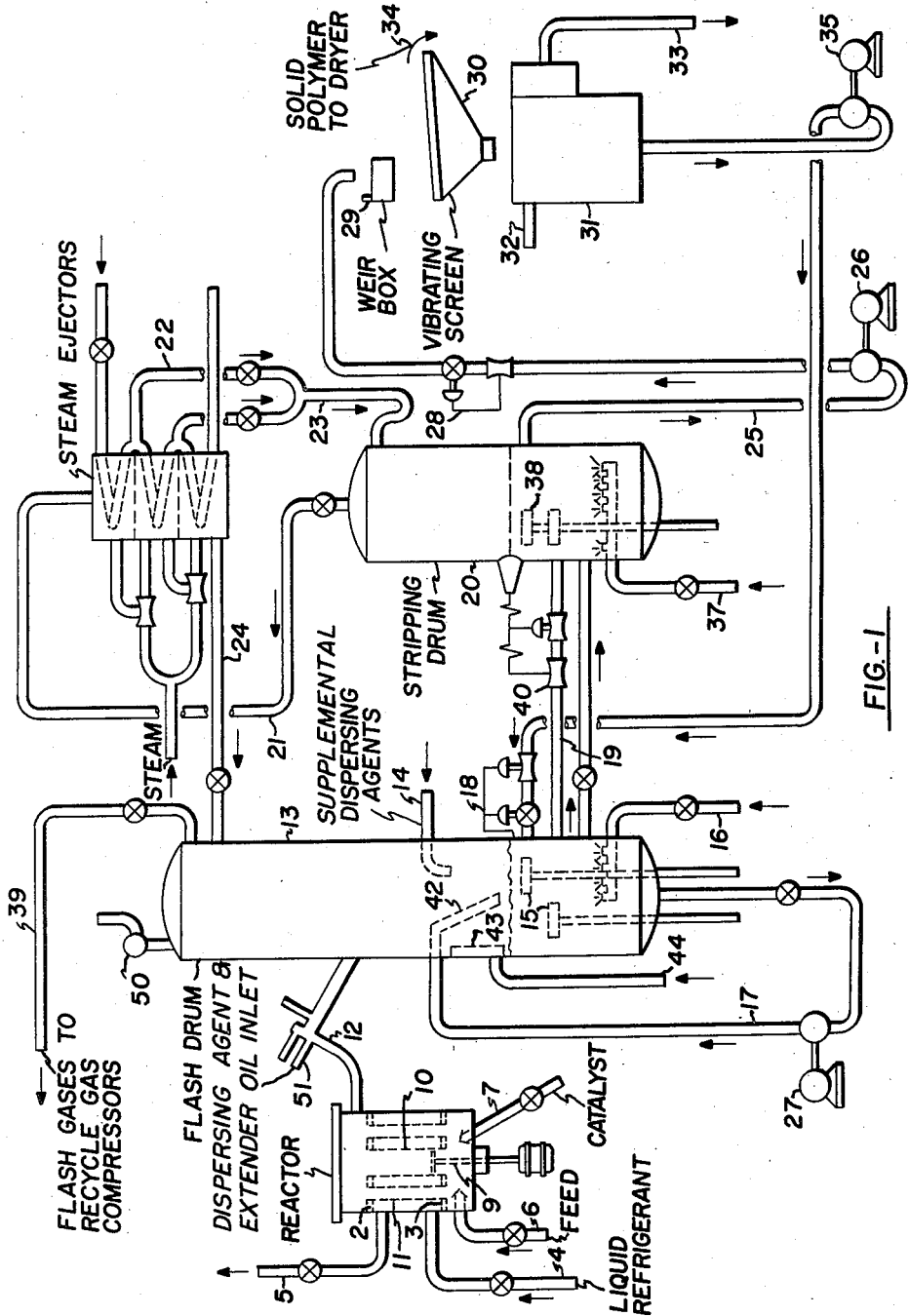
Figure 1 is a diagrammatic view of an apparatus suitable for carrying out the invention.

Referring to the drawings, the polymerization equipment consists of a tube bundle type of reactor 1. No internal refrigerant is used, all the heat of reaction being transferred through the reactor walls to an external refrigerant. The liquid refrigerant, suitably ethylene, is introduced into the space between tube sheets 2 and 3 through line 4, while vaporized refrigerant leaves the said space through line 5. Precooled reactant mixture of isoolefin and diolefin enters the reactor through line 6. The polymerization mixture desirably consists of from about 60 to 99.5 weight percent of an isoolefin having from 4 to 8 carbon atoms per molecule, isobutylene being the preferred material; and from 40 to 0.5 weight percent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins, such as dimethylallene, or the triolefins, such as myrcene, having up to 10 to 12 carbon atoms per molecule, may also be used. The polymerization mixture contains in addition from 100 parts to 700 or more parts of a diluent such as methyl chloride, ethyl chloride, n-butane, isobutane, carbon disulfide, ethylidene difluoride, etc. The liquid ethylene as external refrigerant cools the mixture to a temperature between —90° C. and —103° C. Catalyst solution is added through line 7 provided with a suitable dispersing nozzle.

The catalyst conveniently consists of a solution of a Friedel-Crafts type catalyst such as aluminum chloride, in solution in a non-complex-forming, low freezing solvent such as ethyl or methyl chloride or carbon disulfide or other mono- or poly-halide containing up to 3 or 4 carbon atoms per molecule or other non-complex-forming solvent which is liquid at temperatures below about —30° C.

The reactant mixture is thoroughly agitated by impeller type agitator 9, so that a circulation of the reacting mixture is produced up through central tube 10 and down through a plurality of peripheral smaller tubes 11, set between tube sheets 2 and 3. The reaction proceeds promptly to form a slurry of solid polymer particles in the diluent and unreacted olefinic components. In those cases in which no diluent is used the polymer forms as a highly dispersed gel in the cold reactant liquid. When a hydrocarbon, such as n-butane, is used as a diluent, the polymer forms a solution in the hydrocarbon. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the polymer forms, which is removed by the liquid ethylene in the space between sheets 2 and 3. The reactor is maintained essentially full of liquid, a mixture of relatively finely divided polymer and excess unreacted hydrocarbons plus diluent overflowing from the reactor through line 12 in amount corresponding to the material fed to the reactor through lines 6 and 7 at a velocity of between 1 and 3 ft. per second, discharging into flash drum 13 in a downward direction. Line 12 may be tilted upward as shown to provide an effective liquid seal on the reactor. At this point a solution of hydrocarbon extender oil in the reaction diluent or other diluent together with a slurry dispersing agent is introduced into line 12 through line 51. Suitable dispersing agents comprise finely divided aluminum monostearate, aluminum distearate, aluminum tristearate, zinc stearate, magnesium stearate, calcium stearate and similar salts of palmitic, etc. acids of high molecular weight and surface active agents in general. The liquid carrying the dispersing agent may be the solution of hydrocarbon extender oil or a solvent like methyl chloride or a low boiling hydrocarbon which does not complicate the solvent recovery process. Water soluble soaps, such as sodium sulfonates, water-soluble petroleum sulfonic acids or any of the commercial surface active agents disclosed in Industrial and Engineering Chemistry, January, 1939, pp. 66–69; January 1941, pp. 16–22 and January 1943, pp. 126–130, may also be added. If desired, part of the salt may be made into a thick slurry with a low molecular weight alcohol, such as isopropyl alcohol, or alcohol and water, or with water containing one of the above wetting agents and this slurry continuously pumped into the large amount of water in tank 13. About 1 to 4% of metallic stearate based on the polymer is used. The amount of salt added to the flash tank water may vary from 0.5 to 6% based on the dry polymer. However, a range of 1 to 4% is preferred. The oil and dispersing agent is added in a solvent to give rapid dissolution in the reactor effluent liquid and to prevent freezing of the oil. The amount of solvent should be about the same or more than the amount of oil used. The oil should be well mixed with the solvent prior to addition to the polymerization mixture but it need not be entirely dissolved if undissolved particles be finely divided, such as a minor portion of wax in a paraffinic oil. The oil to be used is, of course, that which is most desirable for incorporation in the finished rubber. This might be naphthenic, aromatic, or paraffinic, depending on what rubber properties are desired. Examples of types of oils which may be used include acid-treated paraffinic petroleum distillates, phenol-treated naphthenic petroleum distillates, white oils, and heavy aromatic petroleum oils. The oil solution preferably should be precooled to avoid coagulating the cold slurry. Some oils may not be completely soluble in the diluent at low temperatuers so that a very finely dispersed emulsion is formed. However, this is immaterial since the extremely small particles of oil are readily absorbed by the very small particles of polymer in the cold slurry due to the large surface available.

Figure 2:
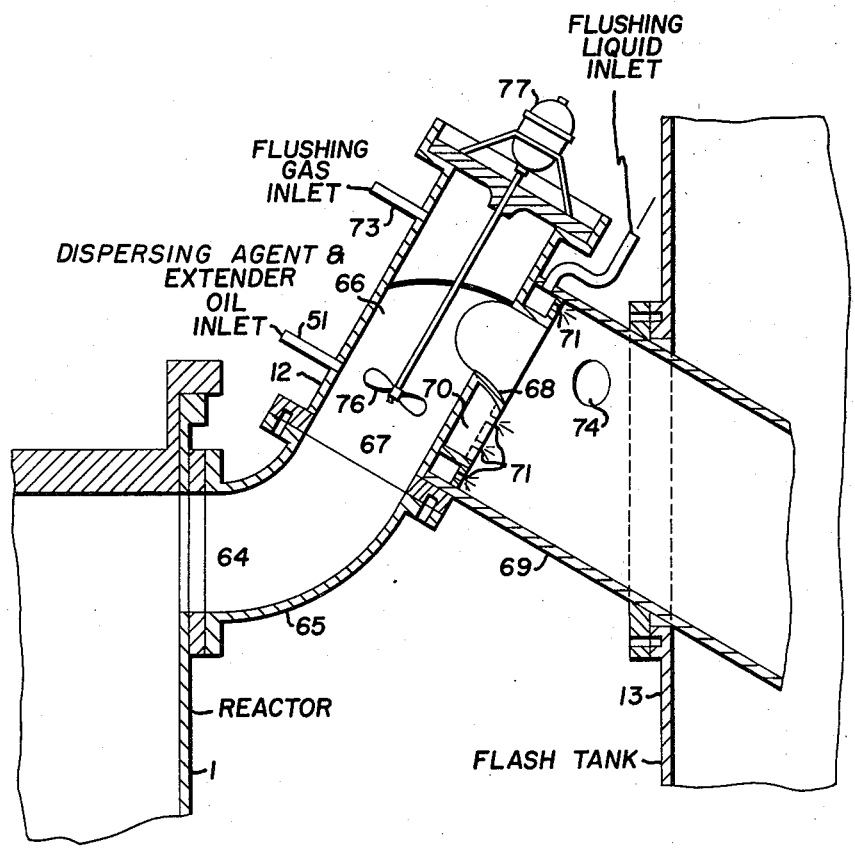
Figure 2 is a vertical cross-section through an overflow particularly suited to the invention.

A particularly suitable method for mixing the extender oil with the polymer slurry is shown in Figure 2. In this embodiment an outlet 64 is arranged at the top of the reactor side wall and comprises a pipe 65 extending upwardly and connecting with an overflow section 66. The overflow section 66 comprises a tubular lower part or pipe 67 which terminates in a weir 68 which extends into a large diameter flash pipe 69. A manifold 70 is arranged at the inlet end of the flash pipe 69 and is connected with a source of heated flashing liquid, preferably water. The manifold is perforated or slotted as at 71 in such a way as to eject a spray or sheet of flashing liquid over the surface of pipe 69. The pipe 69 is sloped downwardly towards the flash tank proper 13, the discharge end of the pipe 69 extending well inside the flash tank.

Inlet pipe 51 is placed at the lower part of overflow section 66 for the introduction of the extender oil and the slurry dispersing agent. An agitator 76 driven by a motor 77 is shown in the discharge pipe for effective mixing of the extender oil with the slurry before it is discharged into the flash tank. An inlet 73 is provided in the overflow pipe 66 for the supply of flushing gas in order to sweep the volatilized materials out of the overflow and flashing pipes. A manhole 74 is arranged in the flash pipe 69 in order that the flow or reaction mixture may be readily observed, and easily reached in the event that the weir becomes fouled with polymer and cleaning or scraping becomes necessary. Before and during the flashing of methyl chloride and unreacted monomers, the slurry particles pick up the previously added dispersing agent as a protective anti-tack film to maintain the water slurry of the oil-extended polymer in water and prevent agglomeration.

Flash tank 13 is a relatively large vessel designed to withstand mild pressure surges, of the order of 1–10 lbs./sq. in. having a relatively large vapor space, providing preferably several minutes nominal holdup of the vapors in the flash tank. The tank is supplied with water or other suitable liquid maintained at a suitable level by means of level control valve 18 which controls the rate of introduction of water to the flash tank. The water slurry is maintained at a suitably elevated temperature level, for example at 100° to 180° F., by means of steam injected through pipe 16 and is kept well agitated by means of turbine type agitators 15.

The polymer and cold liquid falling from line 12 is caught by a rapidly moving sheet of water from line 17 and pump 27 discharging through jet 42 and directed at the center of the surface of the water in the flash tank. For this purpose a 1.5" x 7" rectangular nozzle may be advantageously used for a water flow of around 400 gallons per minute. To protect the tank from sharp thermal shock in case of failure of the water jet a skirt or baffle 43 is provided, a small amount of steam being admitted behind it through line 44. In this way, provision is made for warming up the polymer and volatilizing the liquids without the cold slurry contacting the walls of the flash tank.

The warm liquid, e.g. water, volatilizes out most of the volatile components and at the same time deactivates and washes out much of the deactivated catalyst. Steam is supplied to the flash tank water at 16, to replace the heat lost due to vaporization of the unreacted materials. The polymer tends to float upon the surface of the water but it is kept from doing this by the agitators 15. In general, the polymer contains less than 1%, usually less than 0.1% of volatile hydrocarbon materials.

The vapors leave the flashing zone through line 39 and are fed to compression, drying, liquefaction, and distillation equipment for recovery and return to the reaction zone. The slurry of polymer in water leaves the flashing zone through line 19 and control valve 40 and passes into stripping vessel 20 wherein a suitable sub-atmospheric pressure is maintained. The purpose of this stripping zone is to complete as far as possible removal of volatile materials from the polymer and from the water. In this way, loss of valuable reactant or diluents is minimized, as are fire and other hazards. In addition to the removal of these volatile materials from the polymer, the stripping operation when combined with properly controlled hot air drying in a through-circulation, tunnel-type dryer, makes it possible to achieve essentially complete degassing.

A constant level is held in the stripping zone as well as in the flashing zone. The stripper level actuates control of the rate of flow of slurry from the flashing zone to the stripping zone by control valve 40 and the liquid level in the flashing zone controls the return of water to said flashing zone from the vibrating screen pump by means of control valve 18. In this way a minor upset in flow in any part of the system is less likely to cause improper levels to be held in either of the two zones. It is important to maintain the proper level, since too low a level results in exposure of agitators 15 and thus loss of agitation while too high a level increases the volume of liquid being agitated and hence decreases agitation per unit volume to the extent that considerable settling of the polymer to the surface tends to occur. The stripping vessel is, like the flashing vessel, provided with an agitator 38, a steam injector 37, and a vapor outlet 21. The pressure in the stripping zone is maintained at about 2 to 5 lbs./sq. in. abs. by means of a 2-stage steam injector 22, which embodies condensers before and after each ejector stage. The condensate from the low pressure stages is returned to the stripper through leg 23 while the recovered vapors are sent to the flashing zone, through line 24. The slurry leaves the stripper through line 25 with the aid of pump 26 at a rate controlled by flow controller 28 and passes into weir box 29 from which it is distributed over vibrating screen 30. Excess water drains through the vibrating screen into tank 31, the moist polymer discharged from the end of vibrating screen at 34 containing a substantial percentage of water. The moist polymer is supplied to an endless screen passing through a tunnel dryer of the through-circulation type in which hot air is recirculated over steam coils and down through a bed of material on the screen. Fresh air enters at the discharge end of the tunnel and moist air is exhausted to the atmosphere at various points along the dryer. Drying temperatures of up to about 340° F. are utilized and these conditions of good contact of the rapidly moving air stream with finely divided polymer suffice to drive off residual volatile materials which could ordinarily give rise to blister formation during vulcanization if they were not removed. Water draining through vibrating screen 30 into tank 31 is returned to the flash tank 13 by means of pump 35 and flow controller 18 in order to save water, slurry dispersing agents and any other valuable materials contained therein.

Tank 31 is provided with fresh water makeup 32 and a water overflow 33 to provide for purging any undesirable accumulations. It will be noted that flow controllers shown in slurry lines utilize a Venturi meter instead of the usual orifice type of meter as the measuring device in order to avoid plugging by the solid polymer particles. The control valves are also of a special streamlined design which are not readily plugged by solid material. In order to take care of any large surges in pressure as may occur if a large slug of polymer or of reaction mixture should strike the water in the tank, a suitable safety valve 50 may be provided on the flash chamber.

The operation of the invention is as follows: Liquid ethylene is circulated through the cooling jacket of the reactor as well as the cooling jacket in the discharge pipe if one is provided. Reaction mixture comprising about one part of a 97.5% isobutylene and a 2.5% isoprene mixture in from about three to ten parts of methyl chloride is supplied continuously to the reactor and circulated therein. Catalyst solution comprising about 0.15% of $AlCl_3$ dissolved in methyl chloride is introduced into the reaction mixture continuously. At the same time a mixture of zinc stearate in a solution of methyl chloride and equal volumes of an acid-treated distillate or other extender oil at a temperature near that of the slurry is introduced into the overflow 66 through line 51. The mixture is agitated thoroughly and after a short residence time in the overflow a slurry of polymer particles in reaction mixture continuously flows out of the reactor through the overflow pipe and over the weir. A hot flashing liquid, preferably water at about 150° F., is supplied to the manifold and is sprayed as a fast moving (20 ft. per second or greater) stream onto the inner surfaces of the flash pipe. The cold slurry of polymer in reaction mixture flows over the weir and hits the fast moving stream of hot water which vaporizes unreacted materials and disperses the polymer as finely divided slurry. The polymer is carried down through the flash line into the main flash tank which contains a substantial quantity of water which is thoroughly agitated by means of suitable stirring or agitating devices and which is heated as by direct introduction of steam in order to flash off any residual volatile materials that may be associated with the polymer. The water slurry of polymer is then, if desired, subjected to a vacuum stripping operation, dewatered and the polymer dried in the usual way.

liters of water at 80 to 85° C. with vigorous stirring whereupon the temperature dropped to 50 to 52° C. when the methyl chloride was removed. In some of the experiments, zinc stearate was added along with the plasticizing oil; in others it was added to the flash tank water. The results are summarized in the following table.

| Experiment | Oil-Plasticizer | | ZnSt, p.h.r. | Hot Water Slurry | Mooney, 5' @ 212° F. | I.V.[2] | Unsaturation, Mole percent |
|---|---|---|---|---|---|---|---|
| | p.h.r.[1] | Type | | | | | |
| 1 | 0 | | 2.5 with oil | Stable | 79 | 1.22 | 0.85 |
| 2 | 25 | Forum 40 | do | Agglomeration but no balling | 35 | 1.07 | 1.29 |
| 3 | 15 | do | do | Stable good slurry | 50 | | |
| 4 | 20 | do | do | Slight agglomeration but well broken with stirring | 47 | | |
| 5 | 15 | do | 2.5 in H₂O | Agglomeration and balled-up | 53 | | |
| 6 | 25 | Marcol JX | 2.5 with oil | No balling. Particles were sticky and would agglomerate when stirring was stopped but would easily redisperse on restirring. | 33 | | |
| 7 | 0 | | do | Fine slurry | 60 | | |
| 8 | 25 | Forum 40 | do | No balling. Particles were sticky and would agglomerate when stirring was stopped. | 20 | | |
| 9 | 20 | Coray 230 | do | No balling. Particles were sticky and would agglomerate when stirring was stopped. (Sticky to hand.) | 30 | | |
| 10 | 15 | do | do | No balling. Particles were sticky and would agglomerate when stirring was stopped. Some agglomeration during flashing but polymer remained slurried until stirring was stopped. It would redisperse on restirring. This Coray 230 imparts a brown color to the polymer and makes it more sticky than the white polymers from Forum 40 or Marcol JX. | 33 | | |
| 11 | 0 | | 0 | Coarse. Matted slightly on standing but redispersed on stirring | 78 | 1.88 | 1.14 |
| 12 | 0 | | 0 | do | 81 | | |
| 13 | 0 | | 1 in H₂O | Medium coarse. Stable slurry | 82 | 1.87 | |
| 14 | 0 | | 1 with oil | do | 81 | 1.88 | 1.14 |
| 15 | 15 | Marcol JX | do | Medium coarse. Matted on standing but redispersed on stirring | 57 | | |
| 16 | 15 | Coray 230 | 2.5 with oil | Sticky and agglomerated but not balled up. Not a very satisfactory slurry. After 24 hrs. standing it was matted but not sticky. The oil had dissolved in the polymer. | 36 | 1.87 | |
| 17 | 0 | | 0 | Recovered in alcohol—control for mol. weight | 82 | 2.17 | 1.55 |
| 18 | 15 | Necton 60 | 2.5 with oil | Sticky but did not ball-up | 61 | | |
| 19 | 15 | do | do | do | 61 | | |
| 20 | 0 | | 0 | Recovered in alcohol—control for mol. weight | 81 | 2.22 | 1.42 |
| 21 | 15 | Necton 45 | 2.5 with oil | Some agglomeration. Matted on standing but dispersed on stirring. | 60 | | |
| 22 | 15 | do | 2.5 in H₂O | More sticky and polymer balled-up | 60 | | |
| 23 | 15 | do | 2.5 with oil | Some agglomeration but well dispersed on stirring. Stable after 24 hours standing. | 62 | | |
| 24 | 10 | do | do | Slight agglomeration but well dispersed on stirring. Stable after 24 hours stirring. Slight matting on standing but easily dispersed. | 63 | | |
| 25 | 10 | do | do | Well dispersed and stable | 55 | | |
| 26 | 10 | do | do | Slight agglomeration but easily dispersed | 56 | | |
| 27 | 15 | Forum 40 | do | Remained dispersed while stirring. Some agglomeration on standing. | 40 | | |
| 28 | 20 | do | do | Remained dispersed but the polymer was a little more sticky than 15 parts Forum 40. | 35 | 1.94 | |

[1] Parts by weight per hundred parts of rubber or polymer by weight.  [2] Intrinsic viscosity.

Legend:

| | Sp. g. | Flash, ° F. | Viscosity (SSU) | | I₂No, cg./g. |
|---|---|---|---|---|---|
| | | | 100° F. | 210° F. | |
| Forum 40 acid-treated paraffinic petroleum distillate | 0.886 | 400 | 111 | 40 | 24.1 |
| Necton 45 phenol-treated naphthenic petroleum distillate | 0.890 | 375 | 205 | 45 | 30.5 |
| Necton 60 phenol-treated naphthenic petroleum distillate | 0.90 | 445 | 510 | 60 | 16 |
| Marcol JX White oil from the heavy acid treating of a naphthenic petroleum distillate. | 0.875 | 330 | 90 | 38 | <1 |
| Coray 230 Heavy aromatic petroleum oil | 0.959 | 520 | 11,600 | 230 | 48.6 |

*Example*

A cold polymer slurry was prepared by batch polymerization of a typical mixture composed of:

960 ml. of methyl chloride
    380 ml. of isobutylene (97 parts by wt.)
    9 ml. of isoprene (3 parts by wt.)

A series of experiments were carried out in each of which catalyst (0.22 gram of aluminum chloride per 100 ml. of methyl chloride) was added at a rate of 15.6 ml. per minute for 10 minutes to this cold feed (−102° C.). This produced a slurry of 16 grams of polymer per 100 ml. of reactor effluent which is approximately 90% conversion. After the polymerization, a solution of a plasticizing oil and phenyl-beta-naphthylamine (0.25% on the polymer) in 100 ml. of methyl chloride was added to the cold slurry. This cold slurry was then poured into 6 to 8

Experiments 5 and 22 show that whenever the zinc stearate was added to the water in the flash tank and polymer slurry containing oil was introduced into this water the polymer agglomerated into single mass and the flashing process was considered inoperable. However, other experiments show that a good stable slurry can be obtained with the same oil in the cold slurry when the same amount of zinc stearate is added to the cold slurry and the flashing is done in plain hot water.

The nature of the present invention having been thus fully set forth and a specific example of the same given, what is claimed as new and useful and desired to be secured by Letters Patent is:

1. A process which comprises polymerizing a feed containing an isoolefin of not more than about 7 carbon atoms in a polymerization zone at a temperature level between about −40° and about −160° C., with a Friedel-Crafts catalyst dissolved in an organic non-complex forming solvent which is liquid but a polymer non-solvent at polymerization temperatures, mixing the resulting cold slurry of polymer particles in the non-solvent with an essentially monomeric petroleum hydrocarbon plasticizer oil and a water-insoluble fatty acid soap of a metal selected from the group consisting of magnesium, zinc, aluminum and calcium, subsequently discharging the resulting mixture in slurry form into an aqueous medium heated to a temperature of 100° to 180° F. to drive off the volatile materials in said reaction mixture and maintain the polymer in finely-divided form as a slurry in water, and recovering the polymer particles from the water.

2. A process which comprises mixing about 60 to 99.5 weight percent of an isoolefin of not more than about 7 carbon atoms with about 40 to 0.5 weight percent of a multiolefin having about 4 to 10 carbon atoms in an organic copolymerization diluent having less than 5 carbon atoms which is liquid but a non-solvent for the copolymer formed at the copolymerization temperature, cooling the resulting mixture to a temperature level within the range of between about −90° C. and about −103° C., contacting the cold mixture formed with a solution of a Friedel-Crafts catalyst in a non-complex forming organic solvent which is liquid but a copolymer non-solvent when contacted with said mixture, to form a cold slurry of copolymer particles in the reaction mixture, adding to said cold slurry an admixture of a solution of a petroleum hydrocarbon plasticizer oil in a solvent, a water-insoluble fatty acid soap having about 16 to 18 carbon atoms per molecule of a metal selected from the group consisting of magnesium, zinc, aluminum and calcium, and a wetting agent, discharging the resulting reaction mixture in slurry form into an aqueous medium heated to a temperature of 100° to 180° F. so as to drive off the volatile materials in said reaction mixture and maintain the copolymer in finely-divided form by slurrying the same in water, and recovering the copolymer in particulate form from the water.

3. A process which comprises polymerizing an isobutylene-containing feed at a temperature between about −40° C. and about −160° C., in a diluent having about 1 to 4 carbon atoms per molecule which is liquid but a non-solvent for the polymer at the polymerization temperature, with a Friedel-Crafts catalyst dissolved in an organic non-complex forming solvent which is liquid but a non-solvent for the polymer at the polymerization temperature to form a cold slurry of solid polymer particles in cold reaction liquid, adding to said cold slurry a mixture of a precooled solution of a petroleum hydrocarbon plasticizer oil and a water-insoluble fatty acid soap having about 16 to 18 carbon atoms per molecule of a metal selected from the group consisting of magnesium, zinc, aluminum and calcium, discharging the resulting slurry into a hot, agitated aqueous medium to drive off volatile components of the reaction mixture and form a slurry of finely-divided polymer particles in water, and recovering the polymer particles from the water slurry.

4. A process according to claim 3 wherein the solvent for the petroleum hydrocarbon plasticizer oil is a hydrocarbon having about 1 to 4 carbon atoms per molecule.

5. A process according to claim 3 wherein the solvent for the petroleum hydrocarbon plasticizer oil is an alkyl halide having less than 3 carbon atoms per molecule.

6. A process which comprises copolymerizing in a reaction zone at a temperature level between about −40° and −160° C. about one part of a mixture comprising about 60 to 99.5 weight percent of isobutylene and about 40 to 0.5 weight percent of a conjugated diolefin having about 4 to 10 carbon atoms per molecule in up to about 10 parts by weight of an organic reaction diluent having about 1 to 4 carbon atoms per molecule which is liquid but a copolymer non-solvent at the copolymerization temperature by adding thereto a solution of an aluminum halide catalyst in a low-freezing, non-complex forming solvent, which is liquid but a copolymer non-solvent at the copolymerization temperature, to form a slurry of solid copolymer particles in the reaction mixture, withdrawing the slurry from the reaction zone, mixing the slurry with a mixture of zinc stearate and a solution of a petroleum hydrocarbon plasticizer oil dissolved in additional reaction diluent, discharging the resulting reaction mixture into an aqueous medium heated to a temperature of 100° to 180° F. to drive off the volatile constituents in said mixture and to form a slurry of finely divided copolymer particles in water, and recovering the copolymer particles from the water slurry.

7. A process which comprises copolymerizing in a reaction zone about one part of a mixture consisting of about 90 to 99.5 weight percent isobutylene and about 10.0 to 0.5 weight percent of isoprene in up to about 5 parts by weight of methyl chloride while maintaining the reaction mixture at a temperature level between about −90° C. and about −103° C., thereby forming a slurry of solid polymer particles in the reaction mixture, withdrawing the slurry formed from the reaction zone and discharging it into a mixing zone, adding to said mixing zone an admixture of zinc stearate and a precooled solution of a petroleum hydrocarbon plasticizer oil dissolved in methyl chloride, agitating the copolymer oil mixture in said mixing zone, discharging the resulting mixture into agitated water heated to a temperature of 100° to 180° F. to drive off the volatile constituents in reaction mixture and form a slurry of finely-divided copolymer particles in water, and separating the copolymer particles from the water slurry.

References Cited in the file of this patent

UNITED STATES PATENTS

| 2,160,996 | Wiezevich | June 6, 1939 |
| 2,607,763 | Hipkin et al. | Aug. 19, 1952 |

OTHER REFERENCES

D'Ianni et al.: "Oil-Extended Synthetic Rubber," Rubber Age, volume 69, Issue 3, pp. 317–321, published June 1951.